July 29, 1930.  G. B. MUSTIN  1,771,982
CHEWING GUM AND METHOD OF MAKING SAME
Filed Sept. 10, 1928  2 Sheets-Sheet 1
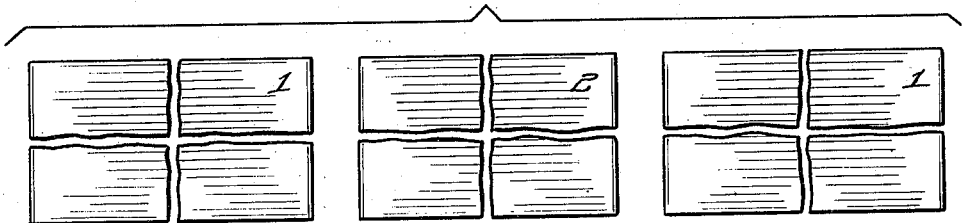
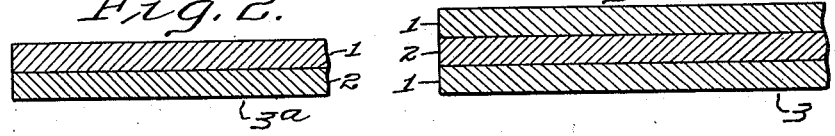
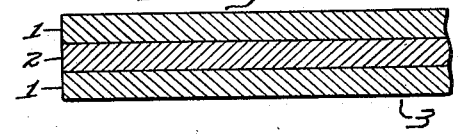
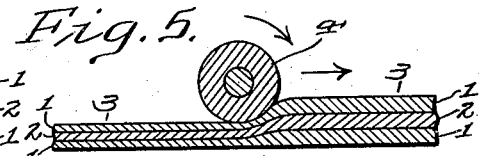
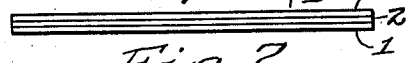
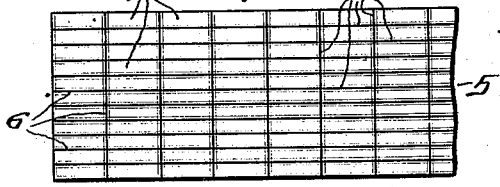
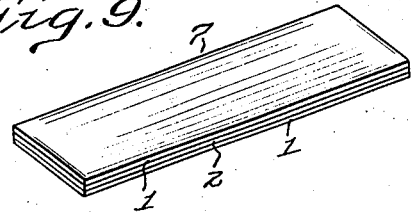
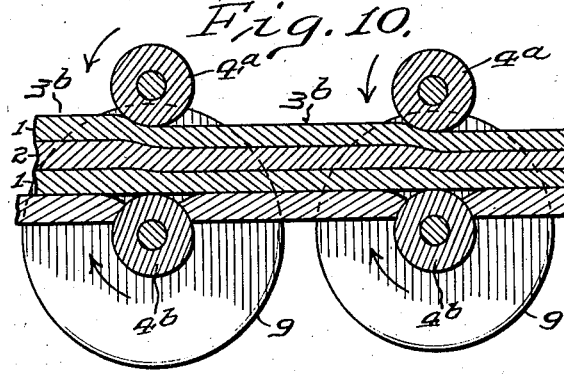
INVENTOR
Gilbert B. Mustin
BY Alston B. Moulton
ATTORNEY
WITNESS
F. J. Hartman.

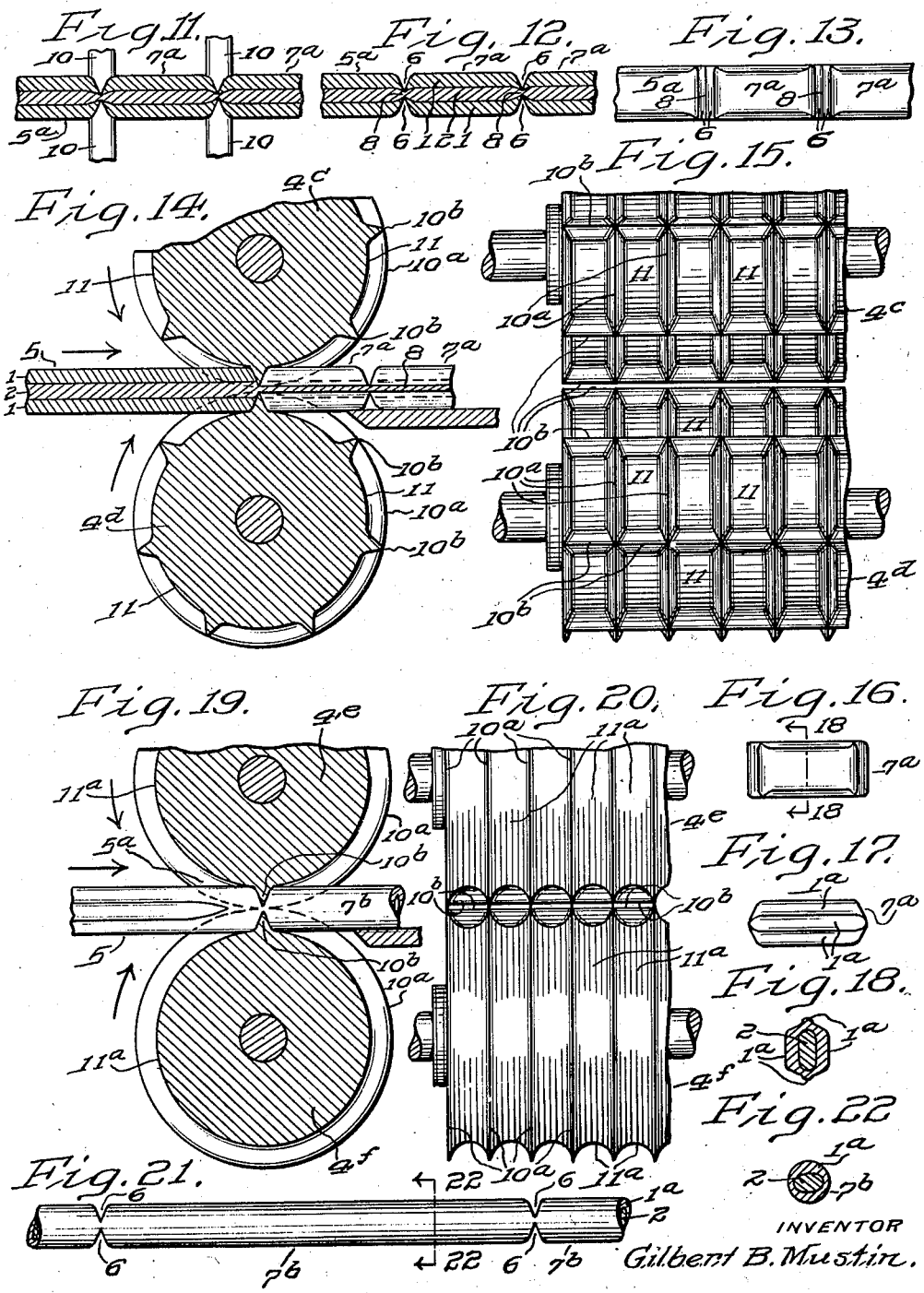

UNITED STATES PATENT OFFICE

GILBERT B. MUSTIN, OF LANSDOWNE, PENNSYLVANIA

CHEWING GUM AND METHOD OF MAKING SAME

Application filed September 10, 1928. Serial No. 304,935.

Heretofore difficulty has been experienced in making chewing gum, strong in flavor and pleasant to taste, because the masticable material in the gum does not readily take up or absorb very much of the flavoring material. It is only by using a flavoring material of a relatively high concentration and in quantity several times greater than that used by confectioners in flavoring a sugar confection, that a satisfactory flavor can be imparted to the gum.

Sugar or confectionery made substantially of sugar, will absorb and retain almost any flavor, and the flavor of such confectionery is readily recognized as being what the consumer regards to be the true flavor, although to impart that flavor to confectionery is required a very much smaller amount of flavoring material of a lower concentration, than that required to impart a much less pronounced flavor to the masticable portion of chewing gum.

One object of my invention is to produce a chewing gum having a fuller, stronger, richer flavor, than that obtainable by the usual methods of making chewing gums, and with a smaller quantity of flavoring material of lower concentration.

A further object of my invention is to produce a piece of chewing gum wherein the masticable insoluble ingredients are in one layer or ply of the finished piece of chewing gum and the main or substantial flavor for the piece of gum is on one or more plies or layers of a creamy, non-crystalline dry confectionery, unitarily and inseparably united to the first mentioned layer.

A further object of my invention is to produce a piece of chewing gum wherein a layer of chewing gum of good quality is firmly inseparably united to one or more plies or layers of a non-crystalline smooth, non-hydroscopic sugar confectionery and in which the union of the layers at the plane of contact between the plies or layers is so intimate that the confectionery layers, normally brittle when dry, are substantially changed and remain slightly flexible and will not break, or chip off, or separate from the masticable layer of gum, when the piece of gum as a whole, is broken or severed.

A further object of my invention is to provide a manner of making a laminated sheet or base sheet which may be subdivided in a variety of ways to form individual strips, sticks, pillows, drops, disks and flat pieces of various shapes, said pieces being all composed of a layer of chewing gum proper and one or more layers of smooth, non-crystalline grit-free flavored sugar confectionery inseparably united thereto.

A further object of my invention is to provide a new and improved method or process of making a chewing gum of which one or more of the outer surfaces are composed of a non-hydroscopic somewhat flexible sugar confection, carrying the main or principal flavoring ingredient for the piece, and which does not crack off, or flake off or break away from the piece of gum when the piece is broken or severed.

Other objects of my invention will be disclosed in the specification and claims below.

In the drawings forming a part of this specification and in which the same reference characters are employed throughout the various views to designate the same parts, Fig. 1 indicates, in plan view, two relatively large thick sheets of lozenge dough and one like large thick sheet of masticable material, which may be any chewing gum of good quality, said batches being formed in any suitable convenient manner, preferably by a rolling action.

Fig. 2 is a vertical cross-sectional fragmentary view of a portion of a thick two-ply composite sheet, one ply of which is composed of a chewing gum material and the other ply of which is composed of a confectionery dough.

Fig. 3 is a similar fragmentary vertical cross-sectional view of a thick three-ply composite sheet, wherein the intermediate ply is of chewing gum material and the two outer plies are of lozenge dough.

Fig. 4 is a somewhat diagrammatic illustration in vertical cross-section of the manner in which the three-ply sheet shown in Fig. 3, may be reduced in thickness, by a rolling action, and how the thickness of the plies, composing said composite sheet, are reduced in thickness proportionally, Fig. 5 is a view similar to Fig. 4 showing a continuation of the rolling step on the composite sheet shown in Fig. 4 and the resultant reduction in the thickness of the composite sheet and of the plies thereof.

Fig. 6 is a side elevational or edge view of what I have termed herein a laminated plastic ductile base from which individual pieces of chewing gum may be formed. This base is produced by rolling the composite sheet shown in Fig. 3 until its thickness is reduced to what the completed piece of gum is to be.

Fig. 7 is a plan view on a reduced scale of a portion of the sheet, shown in Fig. 6 and deeply scored to form a large number of small thin individual strips or sticks or pieces which may be readily broken away from the sheet when cool.

Fig. 8 is a fragmentary sectional view on a larger scale than that of Fig. 7 of the finished base sheet showing the deep scorings which are indicated by lines in Fig. 7 and showing the ends of the intermediate ply substantially covered with the material of the confectionery layers.

Fig. 9 is a perspective view of a finished individual piece of chewing gum made in accordance with my improved process.

Fig. 10 is a diagrammatic illustration of the manner in which a relatively narrow strip, cut or severed from such a composite sheet, as is shown in Fig. 3, may be reduced in thickness down to the thickness of the finished piece of goods, by passing the strip through a series of pairs of rollers, each operative to reduce the thickness of the composite sheet and also to proportionally reduce the thickness of the various plies.

Fig. 11 is a diagrammatic cross-sectional view showing how a strip, thicker than that shown in Fig. 6, and delivered from the last of the reducing rollers of the mechanism shown in Fig. 10, may be scored and subdivided longitudinally into sticks or pillows.

Fig. 12 is a longitudinal sectional view showing the strip of Fig. 11 after the same has passed through the scoring means; and Fig. 13 is a plan view of the same.

Figs. 14 and 15 are sectional and elevational views respectively of another manner of making pillows or tablets from the composite laminate base similar to that shown in Fig. 6, but somewhat thicker, by passing the base sheet through rollers having closely arranged series of recesses with tapered walls, and recesses in one roller being brought into registration with those in the other roller, when the rollers are rotated at the same surface speed.

Fig. 16 is a plan view of a finished piece of gum, produced by the operation of the mechanism, shown in Figs. 14 and 15, and separated from the sheet at the scoring.

Fig. 17 is a side or edge elevational view of the same showing how the inner ply or layer of chewing gum is substantially completely enclosed by the confectionery dough after passing through the mechanism shown in Figs. 13 and 14; and Fig. 18 is a similar cross-sectional view taken on the line 18—18 of Fig. 16.

Figs. 19 and 20 are respectively a vertical sectional view and a rear elevational view of a portion of a pair of coacting grooved rollers in which the grooves on the one roller register with the grooves on the other roller to subdivide the laminated base into a plurality of rods or pencils.

Fig. 21 is a side elevational view of the rod produced by the mechanism of Figs. 19 and 20 and showing the rod divided by scoring into pencils of appropriate length; and Fig. 22 is a cross-sectional view of a finished pencil of gum, taken on the line 22—22 of Fig. 21.

In making my improved stick, strip or piece of chewing gum, I first prepare a plastic mass or batch or loaf of smooth creamy, non-crystalline plastic flavored confectionery dough, such as lozenge dough, the ductility of which is not substantially changed by ordinary variations in temperature between 85° and 150° F. I also similarly prepare a batch or loaf of chewing gum composed of the materials usually employed in the making of commercial chewing gums of good quality, the ductility of which increases as the temperature rises and which is readily rolled and worked between the temperature of 80° and 150° F. The batch of chewing gum is preferably flavored with the same flavoring as that employed in the confectionery dough because one of the main objects of my invention is to produce a chewing gum having any single, simple flavor of the many well-known and pleasing flavors which are available to the makers of confectionery.

The temperature of the batch of chewing gum material is brought to a point whereat its plasticity or ductility is substantially the same as that of the confectionery dough and I roll out the confectionery dough into one or more thick sheets 1, and at the same time roll out the chewing gum material into a similar thick sheet 2 as clearly indicated in Fig. 1. These sheets having substantially the same plasticity and ductility and being relatively thick,—that is to say, considerably thicker than the layers and plies will be in the finished individual piece of gum,—are superposed one on the other to make a composite or laminate sheet of two or more plies.

If I desire to make a two-ply piece of chewing gum, for the purpose of improving the flavor of the product I then superpose one thick sheet or piece of confectionery dough 1, upon a similar thick piece of chewing gum material 2, to form the thick composite sheet 3ª as indicated in Fig. 2. I generally prefer to make a three-ply piece of chewing gum, wherein the gum is substantially covered by the confectionery and is therefore protected from contact with the atmosphere, and I place one thick sheet of chewing gum material 2 upon a thick sheet 1 of confectionery dough and upon the thick sheet 2 of chewing gum material I place a second sheet 1 of confectionery dough, thus making the thick composite three-ply sheet 3.

While these thick layers or plies 3 or 3ª are warm and the ductility of the chewing gum layer 2 is substantially like that of the confectionery layer 1, I progressively roll out this thick composite sheet by any suitable rolling means, as with a rolling pin 4 indicated in Figs. 4 and 5 into the thin composite base sheet 5 shown in Fig. 6.

Fig. 5 illustrates a continuation of the rolling step shown in Fig. 4, and the thickness of the composite sheet further reduced from what is indicated in Fig. 4, but not down to the thickness or thinness of the base or foundation sheet 5 indicated in Fig. 6. Because the ductility of the materials constituting these plies 1 and 2 is the same, the thickness of these plies of the composite sheet 3 are proportionally reduced by the reduction in thickness of the composite sheet 3 and the finished base sheet 5 will be composed of as many plies 1 and 2 as there were in the thick sheets 3 or 3ª.

While this base sheet 5 is in a soft and pliable condition it may be and preferably is divided with scorings 6, 6, at right angles to each other, dividing the composite base 5 into a large number of like individual pieces 7, connected by a thin web of material 8, as clearly indicated on an enlarged scale in Fig. 8. The scored sheet is then put aside and allowed to cool whereupon, when cool, the individual pieces 7 may be readily snapped from the main sheet and packaged in any desired manner.

In carrying out the process above described, I have discovered that the rolling action to which the layers 1 and 2 are subjected, as indicated in Figs. 4 and 5, produces a very firm union of the plies 1 and 1 to the ply or layer 2 of gum. Since the plasticity of the materials of these layers is substantially the same, the material of one ply appears to flow into and mix slightly with the material of the adjacent ply at the plane of their contact so that there is no clean line of demarcation or cleavage between any two plies. The plies cannot be pried apart and separated from each other.

Moreover, this rolling action and this intimate contact of the plies appears to effect the transference of some of the moisture and gummy content of the intermediate ply 2 of gum into the contacting or engaging layer or layers 1 of confectionery material with the result that the physical properties of the outer plies 1 of confectionery material are substantially changed. Insead of being brittle and frangible, as the lozenge material normally would be upon drying, the outer confectionery plies 1 of my improved piece of chewing gum upon standing remain creamy to the taste but dry and non-tacky to the touch, and are slightly elastic or pliable so that when a piece of my laminated chewing gum is broken or severed or slowly bent, the confectionery material does not crackle or snap or chip or break away or break back from the point of severance free from the layer of gum, but remains as an intact layer of the piece of gum up to the very point of severance or break.

I may reduce the thickness of the composite sheet, diagrammatically illustrated in Fig. 3 down to a laminated base material, such as is shown in Fig. 6, wherein the total thickness of the laminated base of gum 7 shown in Fig. 9 is only about $\frac{3}{8}$ of an inch which is the thickness of an ordinary piece of chewing gum as packaged and placed on the market.

Of course, it is not necessary to reduce the thickness of the base 5 down to these small dimensions. Indeed, in one form of my invention, the thickness of the intermediate ply 2 of a finished piece of chewing gum is about $\frac{1}{4}$ of an inch and the plies or layers of confectionery material are thicker than they are in Fig. 7, as will be discussed below.

This feature of my invention is discussed at the present time, however, because I wish to make it plain that when the quantity of chewing gum in an individual piece of my improved gum is substantially less than that contained in an ordinary piece of gum of substantially the same size, I may and preferably do substantially increase the insoluble content of my layer 2 of chewing gum, so that the volume of the insoluble residue, left in the mouth of the user, will be substantially the same as that which is left in chewing a piece of ordinary gum. Except for this feature, the chewing gum which I use for the layer 2 of my improved piece of chewing gum is substantially like that of present day commercial chewing gum of good quality with respect to chicle, glucose, sugar and flavoring ingredients and proportions thereof to each other.

In Figs. 10 to 13, is diagrammatically illustrated a modified method of making another form of my improved product, wherein I provide three sets of co-acting rollers 4ª—4ᵇ between which a narrow strip 3ᵇ from a thick composite sheet 3, such as is shown in Fig. 3, may be progressively reduced in thickness. In this case, however, in order to preserve the width of said strip 3ᵇ, one roller, (e. g. roller 4$^b$) of each of the sets of rollers is preferably provided at each end with a flange 9 to prevent the lateral or transverse flow of the material of the composite sheet as it passes between the sets of rollers. The base 5$^a$ so formed is preferably relatively thick, but narrow in width, and it may be provided with scorings 6 at suitable intervals, by suitable scoring knives or edges 10, 10, indicated in Fig. 11.

When so scored, the individual pieces 7$^a$ may be in the form of pillows or cushions connected by a thin web 8 of unsevered material. When cold, these pieces or series of pillows 7$^a$ may be severed or broken apart to form individual pieces 7$^a$ to be packed in cartons, or the scored pieces may be packaged in suitable lengths and the individual pillows 7$^a$ may be broken off as one consumes the bar or stick of gum.

In Fig. 14 I have disclosed a further modification of my invention wherein the composite base 5 as is shown in Fig. 6, is passed between a pair of rollers mounted on parallel axes and with their peripheries substantially in contact, each cylinder 4$^c$ and 4$^d$ having its surface provided with a series of tapering recesses 11 adapted to be brought into registration with each other as the rollers rotate in the direction indicated by the arrows in Fig. 14. The walls of these recesses are preferably tapering to provide a substantial draft so that the chewing gum molded therein, may not stick therein. Because the outer edges of the recesses 11 of the rollers are in contact or substantial contact, they substantially form knives 10$^a$—10$^b$ for deeply scoring or severing the individual pieces 7$^a$ of gum formed in the recesses 11. Each piece of gum 7$^a$ will be of the "pillow" or "cushion" shape and each will be severed or nearly severed from the adjacent pieces. The tapered side walls of recesses 11 will force the material of the layers 1—1 down the sides and ends of an individual piece of gum 7$^a$ so that the masticable layer 2 may be completely covered or encased in a coating 1$^a$ of lozenge confectionery, as clearly indicated in Figs. 16, 17 and 18.

In Figs. 19 to 22, I have illustrated a modification, wherein the laminated base sheet 5 is passed between a pair of co-acting rollers 4$^e$ and 4$^f$ each having a series of circumferential grooves 11$^a$ substantially semi-circular in cross-section. The edges 10$^a$ of these grooves 11$^a$ are preferably in contact or close. I may provide sharp transverse edges 10$^b$ in the grooves 11$^a$ to divide the pencils 7$^b$ formed in the grooves 11$^a$ into suitable lengths. The open spaces between the rollers 4$^e$ and 4$^f$ are substantially circular. When the composite sheet 5 is passed through these rollers, it will be divided into strips 5$^a$ and then shaped into cylindrical pencils 7$^b$, each having a core 2 of gum substantially surrounded by a layer 1$^a$ of lozenge dough tightly pressed against the core 2 so that the coating will be slightly penetrated by the material of the layer 2 and the confectionery, when dry, will be smooth and slightly flexible. The coating will not chip or break off from the core when a piece of gum is broken or severed nor feel crisp or crackly or gritty in the mouth. The pencils or rods 7$^b$ so formed are provided with suitable scorings 6, so that when the pencils are cool they may be broken apart and packaged in any suitable manner.

If it is desired to make certain that the core 2 of the pencils 7$^b$ is absolutely completely encased in the coating 1$^a$ it is only necessary to manually roll the pencils over a smooth hard surface and thus cause the soft plastic confectionery dough to flow circumferentially of the pencil and cover any exposed edge of the core along the line of its severance from the multiple ply base sheet 5. Fig. 22 indicates how completely the core 2 may be completely covered in this way.

When a piece of gum, made in accordance with my invention, is composed of two plies, such as would be made from the composite sheet 3$^a$, the confectionery material is particularly for the purpose of imparting a full, rich flavor to the chewing gum but the confectionery layer will be slightly flexible when dry. Such a piece of gum should be wrapped in a protective wrapping of tinfoil or waterproof paper to prevent moisture of the air from affecting the product.

But when a chewing gum made in accordance with my process above described is composed of a base 5 of three layers, the individual pieces 7—7$^a$—7$^b$ will be substantially covered on all sides with a surfacing of lozenge confection which is not hydroscopic or deliquescent and which protects the hydroscopic layer of gum from contact with the atmosphere. Such pieces of gum do not require a special wrapping of tinfoil or waterproof paper, but they may be wrapped to keep the product clean.

In carrying out my improved process, in any of the ways above described, the base material out of which the individual pieces are ultimately formed by sub-dividing the base, is a composite strip 5 or 5$^a$ composed of two or more plies or layers, one ply of chewing gum material and the other ply or plies of lozenge confection inseparably united under a pressure sufficient to force the material of one layer into the material of the other layers and to impart to the normally brittle confectionery, a flexibility, smoothness or creaminess, which that confectionery would not have were it not so associated with the layer of chewing gum.

I am aware that there is on the market a type of chewing gum which is termed "candy coated" and in which a mass of masticable chewing gum is enclosed in a coating or surfacing of brittle, crystalline sugar "candy" and that such chewing gum is usually in the form of pillows or cushions having rounded corners and edges, but the confectionery or candy which is so used is applied by a panning process. Such candy coated gums are made by rolling the pieces of gum around in a warm pan containing melted sugar, and the melted sugar accumulates on and covers the gum in the same way that almonds are covered with a coating of sugar. But these candy coatings are not soft like chewing gum. The candy is brittle, crystalline and gritty. When bitten the piece crackles like crystalline sugar, whereas when a piece of my gum is bitten the feel in the mouth is like that of ordinary uncoated gum.

By reason of the firm adherence of the lozenge confection to the layer of chewing gum and to the retention in the confection of a flavoring material sufficient to give a full strong flavor to the gum and because the normally brittle lozenge material does not break off or crumble away from the gum during the mastication of a piece of gum, the confectionery material is readily mixed with the gum by the process of mastication and imparts to the masticable portion of the gum the full, strong natural flavor carried by the lozenge confection.

And because this lozenge confection will retain other flavors which may not otherwise be imparted to chewing gum made in the ordinary way, I am enabled to greatly increase the catalog of flavors for chewing gums and to produce in such gum the taste or flavor that is found in a piece of confectionery or sugar of that flavor. By imparting wherever practicable, the same flavor to the masticable gum as that which is imparted to the coating therefore, I produce a product which when put into the mouth and masticated, has the full rich well recognized aroma or taste of the flavor given thereto and when all of the confection has been dissolved off and out of the masticable portion, there will still remain in the gum as much or more of the fainter flavor as is found in ordinary chewing gum which has not been so enriched.

While I have found that confectionery material known as lozenge dough is well adapted to my process, I do not wish to be construed as strictly limited to the use of lozenge dough for unless specifically claimed, the use of any confectionery material composed in the main of sugar, and which when dry is not tacky or hydroscopic or gritty, or crystalline and which when dry, becomes slightly elastic or flexible and which will retain enough of the flavor to impart to the chewing gum, a rich full natural flavor, is fully within the aim and scope of my invention.

Moreover, the flavor of my chewing gum may be readily indicated by the color of the piece of gum, for to the lozenge material may be given any of the colors, employed by candy makers, to conventionally indicate the particular flavor of the piece,—e. g. green for mint, pink for strawberry, red for wintergreen, white for peppermint, yellow for lemon, orange for orange, so that, after once becoming familiar with the colors used in different flavors of my improved chewing gum, the purchaser may readily select the flavor desired, by the distinctive, identifying color of the piece. Moreover, the variety of colors which may so be employed greatly adds to the attractive appearance of the product.

In my copending application, Serial Number 304,934, filed September 10, 1928, is disclosed and claimed one of the modifications herein described and wherein a thin, flat piece of chewing gum composed of plies or layers of chewing gum and lozenge confection inseparably united.

Having thus described my invention, what I claim and desire to protect by Letters Patent of the United States is:—

1. The method of making chewing gum, which consists in preparing a batch of plastic flavored confectionery dough, the plasticity and ductility of which is not substantially changed by variations in temperature, and which normally becomes brittle and inflexible when dry, and preparing a batch of chewing gum composed of the materials usually employed in the making of commercial chewing gums of good quality, and the ductility of which varies with the temperature and increases as the temperature rises, said last-mentioned batch being maintained at a temperature at which its ductility is substantially the same as that of said confectionery dough, superposing a relatively thick sheet of the material of one of said batches upon a similarly thick sheet of the other of said batches, forming therefrom a laminate base sheet by rolling under pressure said composite sheet thinner and thinner, down to the thickness of the finished piece of gum to be made therefrom, said rolling being effective to evenly reduce the thickness of said composite sheet as a whole, and to reduce the thicknesses of said plies of said composite sheet substantially alike, and to force a little of the material of each ply into the material of the adjacent ply throughout their planes of contact, whereby there is imparted to said ply of confectionery dough, when dry, a slight flexibility, by the incorporation thereinto of the small amount of the material of said ply of chewing gum material, and whereby the adherence of said plies to each other is such that the ply of confectionary will not chip off or break away or separate from the said ply of chewing gum material when the finished piece of chewing gum, made therefrom, is severed or broken, and then dividing said base sheet, so formed and in a plastic condition, into a plurality of like individual pieces.

2. The method of making chewing gum, which consists in preparing a batch of plastic flavored confectionery dough, the plasticity and ductility of which is not substantially changed by variations in temperature, and which normally becomes brittle and inflexible when dry, and preparing a batch of chewing gum composed of the materials, usually employed in the making of commercial chewing gums of good quality, and the ductility of which varies with the temperature and increases as the temperature rises, said last-mentioned batch being maintained at a temperature at which its ductility is substantially the same as that of said confectionery dough, placing a relatively thick sheet of said chewing gum material between two similarly thick sheets of said confectionery dough, then forming a three-ply laminate base sheet by rolling under pressure said composite sheet thinner and thinner, down to the thickness of the finished piece of gum to be made therefrom, said rolling being operative to evenly reduce the thickness of said composite sheet as a whole, and to reduce the thicknesses of said plies of said composite sheet substantially alike, and to force the material of each ply slightly into the material of the adjacent plies in their planes of contact, whereby there is imparted to said plies of confectionery dough when dry a slight flexibility, by the incorporation thereinto of the small amount of the material of said ply of chewing gum material, and whereby the adherence of said plies to each other is such that the plies of confectionery will not chip off or break away or separate from the said ply of chewing gum material when the finished piece of chewing gum, being made therefrom is severed or broken, and then molding said laminate base sheet so formed into a plurality of small like individual pieces and simultaneously forcing the confectionery dough of said upper and lower plies around the side and end edges of each individual molded piece to enclose the ply of chewing gum within said confectionery material.

3. An individual piece of chewing gum, consisting of a masticable core of chewing gum material and a coating of smooth non-crystalline lozenge confection enclosing said core on all sides, said coating, which is normally inflexible when dry, being slightly flexible, when so united, with the said core, and when dry having substantially the consistency of said core of chewing gum, and containing the substantial flavor for said masticable core.

In witness whereof, I have hereunto set my hand this 7th day of September, 1928.

GILBERT B. MUSTIN.